(12) United States Patent
Konaka et al.

(10) Patent No.: US 8,171,320 B2
(45) Date of Patent: May 1, 2012

(54) INFORMATION PROCESSING APPARATUS, OPERATION CONTROL METHOD AND OPERATION CONTROL PROGRAM STORAGE MEDIUM

(75) Inventors: Yosuke Konaka, Kawasaki (JP); Manabu Keyaki, Kawasaki (JP); Teruhiko Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 204 days.

(21) Appl. No.: 12/662,286

(22) Filed: Apr. 8, 2010

(65) Prior Publication Data
US 2010/0223483 A1 Sep. 2, 2010

Related U.S. Application Data

(63) Continuation of application No. PCT/JP2007/069854, filed on Oct. 11, 2007.

(51) Int. Cl.
*G06F 1/32* (2006.01)
(52) U.S. Cl. ........ 713/322; 713/300; 713/320; 713/500; 713/600
(58) Field of Classification Search .............. 713/300, 713/320, 322, 500, 600
See application file for complete search history.

(56) References Cited

U.S. PATENT DOCUMENTS

| | | | |
|---|---|---|---|
| 5,692,201 A | 11/1997 | Yato | |
| 5,808,881 A | 9/1998 | Lee | |
| 5,815,693 A | 9/1998 | McDermott et al. | |
| 6,161,187 A * | 12/2000 | Mason et al. | 713/322 |
| 6,230,279 B1 * | 5/2001 | Dewa et al. | 713/324 |
| 6,802,015 B2 * | 10/2004 | Atkinson | 713/322 |
| 7,225,346 B2 * | 5/2007 | Kawano et al. | 713/300 |
| 2004/0215989 A1 | 10/2004 | Kawano et al. | |

FOREIGN PATENT DOCUMENTS

| | | |
|---|---|---|
| JP | 5-66863 | 3/1993 |
| JP | 6-12158 | 1/1994 |
| JP | 8-6681 | 1/1996 |
| JP | 11-73237 | 3/1999 |
| JP | 2000-148315 | 5/2000 |
| JP | 3385811 | 1/2003 |
| JP | 2004-326236 | 11/2004 |
| JP | 2006-268246 | 10/2006 |

OTHER PUBLICATIONS

English Translation of the International Preliminary Report on Patentability mailed May 20, 2010 in corresponding International Patent Application PCT/JP2007/069854.
International Search Report for PCT/JP2007/069854, mailed Jan. 8, 2008.

* cited by examiner

*Primary Examiner* — Nitin Patel
(74) *Attorney, Agent, or Firm* — Staas & Halsey LLP (57) ABSTRACT

An information processing apparatus having a processing circuit to execute a program by operating at a set operating frequency, including: a measuring section that measures an elapsed time from the user's last operation; a notification section that notifies operation allowing frequencies in the processing circuit and instructs, in response to an elapsed time longer than a predetermined threshold time measured by the measuring section, fixing to a specific low-operating frequency among the operation allowing frequencies and in response to the user's operation in an input section, instructs to release the fixing; and a setting section that selects an operating frequency from among the operation allowing frequencies according to a processing situation and sets the selected operating frequency to the processing circuit and upon release of the fixing, restarts setting of an operating frequency selected from among the operation allowing frequencies, according to a processing situation in the processing circuit.

15 Claims, 9 Drawing Sheets

_PSS TABLE 2.2GHz CPU

| State | Freg |
|---|---|
| 0 | 700MHz |
| 1 | 800MHz |
| 2 | 900MHz |
| 3 | 1.5GHz |
| 4 | 2.0GHz |
| 5 | 2.2GHz |

FIG. 5B

2.0GHz CPU

| State | Freg |
|---|---|
| 0 | 700MHz |
| 1 | 800MHz |
| 2 | 900MHz |
| 3 | 1.5GHz |
| 4 | 1.7GHz |
| 5 | 2.0GHz |

BIOS-ROM

| SECTOR 4 | } SET INFORMATION STORAGE AREA |
| SECTOR 3 | } BIOS CODE STORAGE AREA |
| SECTOR 2 | |
| SECTOR 1 | |

FIG. 10B

SHIPMENT CONFIGURATION AREA

FIG. 11

| DEVICE NAME | SHIPMENT CONFIGURATION AREA |
|---|---|
| X1 | ...... |
| X2 | ...... |
| ... | ...... |
| CPU | OPERATING FREQUENCY LIMITED MODE [EFFECTIVE/INEFFECTIVE]<br>CLOCK STOP LIMITED MODE [EFFECTIVE/INEFFECTIVE]<br>VOLTAGE REDUCTION LIMITED MODE [EFFECTIVE/INEFFECTIVE]<br>...... |
| Xn | ...... |
| ... | ...... |

INFORMATION PROCESSING APPARATUS, OPERATION CONTROL METHOD AND OPERATION CONTROL PROGRAM STORAGE MEDIUM

CROSS-REFERENCE TO RELATED APPLICATION

This is a continuation application of PCT/JP2007/069854, filed on Oct. 11, 2007.

TECHNICAL FIELD

The embodiment discussed herein is related to an information processing apparatus provided with a processing circuit that executes a program by operating at a set operating frequency, an operation control method and an operation control program executed in the information processing apparatus to control operation of the processing circuit.

BACKGROUND ART

Recently, a personal computer (hereafter, abbreviated as a "PC") has become widespread both in companies and home. In the PC, a CPU that is a processing circuit is incorporated and an OS (operating system) that is basic software and various application programs are installed, and various application programs are executed by the CPU under the OS. Here, the CPU is selected from plural operating frequencies from a viewpoint of suppressing such as power consumption and heat generation, and configured to operate at the selected operating frequency. The selection of the operating frequency is made by the OS in such a manner that the OS monitors a current processing situation and according to the processing situation, when processing is busy, selects a high-operating frequency whereas when processing is not busy, selects a low-operating frequency.

Although selecting a low-operating frequency takes more time to perform a same processing, when considering a total power consumption including energy conversion efficiency of a power-supply unit and power consumption in a cooling unit or the like, by lowering the operating frequency, usage efficiency of energy increases and a lower power consumption is realized.

Incidentally, some PCs have a high depth lower power consumption (deep sleep) function.

This is a function to decrease power consumption still further by stopping processing in the CPU itself (clock of the CPU is stopped), and reducing a voltage of power supplied to the CPU to the extent where content of a register in the CPU is maintained.

Here, since the OS automatically changes an operating frequency of the CPU according to a processing demand and a setting of the OS, there is a case where a high-operating frequency is selected to perform processing such as a file index function incorporated in the OS and execution of virus scan software in which taking longer time does not matter at all, eventually causing unnecessary increase in the power consumption.

Also, in such a case where the OS does not utilize the function to automatically change an operating frequency of the CPU according to a processing demand executed by the OS and a setting of the OS and instead, the OS changes a frequency of the CPU uniformly based on a particular operation or a memory access frequency per a unit time, because it is not control by a processing demand, the operating frequency becomes insufficient when staring the processing and the CPU may not be able to supply or obtain necessary data by a timing at which the data is required when staring the processing, possibly generating under-run or overrun.

In addition to reduction of power consumption, reduction of harsh noise is also a major problem. Especially when the CPU stops due to effect of the deep sleep function and when the CPU restarts operation, a large harsh noise may be generated and it is necessary to suppress the harsh noise.

The above problems are common not only in a PC but also in an information processing apparatus in general that includes a CPU to execute a program.

The following literature is known as prior art regarding operating frequency control techniques.

[Patent Literature 1] Japanese Laid-open Patent Publication No. H08-006681.

[Patent Literature 2] Japanese Laid-open Patent Publication No. 2000-148315.

[Patent Literature 3] Japanese Patent No. 3,385,811

DISCLOSURE OF INVENTION

According to an aspect of the invention, an information processing apparatus includes:

a processing circuit that executes a program by operating at a set operating frequency, an input section that receives an input by a user's operation, basic software that has an operating-frequency requesting function for automatically changing the operating frequency of the processing circuit according to a processing request and setting of the basic software;

a setting section that sets the operating frequency in the processing circuit, and a notification section that notifies the setting section of plural operation allowing frequencies of the processing circuit, wherein the setting section selects an operating frequency according to a processing situation in the processing circuit from among the plural operation allowing frequencies received through notification from the notification section and sets the selected operating frequency in the processing circuit, and the processing circuit operates at the operating frequency set by the setting section, the information processing apparatus includes:

a measuring section that measures an elapsed time from the user's last operation in the input section, the notification section instructs, in response to an elapsed time longer than a predetermined threshold time being measured by the measuring section, the setting section to perform fixing to a specific low-operating frequency among the plural operation allowing frequencies, and instructs the setting section to release the fixing in response to the user's operation in the input section, and the setting section sets the low-operating frequency in the processing circuit, upon being instructed to perform the fixing to the low-operating frequency, and restarts setting of an operating frequency according to a processing situation in the processing circuit selected by the basic software from among the plural operation allowing frequencies, upon being instructed to release the fixing.

Since the information processing apparatus of the present invention fixes an operating frequency of the processing circuit to the low-operating frequency when there is no user's operation, in response to a request of selecting a frequency from the basic software, even when processing is busy in the processing circuit, as long as the busy processing is caused by a cause indifferent to the user's operation, the processing is performed at the low-operating frequency which may take longer time to perform the processing, and thus still further lower power consumption is realized.

Here, it is preferable in the information processing apparatus, that the setting section performs issuing of a request to stop the operation of the processing circuit according to a processing situation in the processing circuit, in addition to setting of the operating frequency in the processing circuit, and the information processing apparatus further includes an operation-stop control section that receives the request to stop the operation of the processing circuit from the setting section thereby causing the processing circuit to stop operating, only when the fixing to the low-operating frequency is instructed by the notification section.

Since only when the low-operating frequency is set, operation-stop and operation-restart of the processing circuit is performed, it is possible to reduce a harsh noise, compared to a case where operation-stop and operation-restart of the processing circuit is performed indifferent to an operating frequency.

Furthermore, it is also preferable in the information processing apparatus, that the setting section performs issuing of a request to reduce a voltage of electric power supplied to the processing circuit according to a processing situation in the processing circuit, in addition to setting of the operating frequency in the processing circuit, and the information processing apparatus further comprises a voltage-reduction control section that reduces a voltage supplied to the processing circuit by receiving the request to stop the operation of the processing circuit from the setting section, only when the fixing to the low-operating frequency is instructed by the notification section.

Since only when the low-operating frequency is set, reduction and restoration of a voltage supplied to the processing circuit is allowed, it is possible to reduce a harsh noise, compared to a case where reduction of a voltage supplied to the processing circuit is performed indifferent to an operating frequency of the processing circuit.

Moreover, it is also preferable that the information processing apparatus further includes: a first input setting section that alternatively sets, in response to the user's operation, either one of ineffectiveness and effectiveness of a function of instructing the setting section by the notification section to perform the fixing to the low-operating frequency; a second input setting section that alternatively sets, in response to the user's operation, either one of ineffectiveness and effectiveness of the operation-stop control section, the ineffectiveness being a state in which when the request to stop the operation of the processing circuit is issued from the setting section, the operation-stop control section receives the request irrespective of the operating frequency of the processing circuit and causes the processing circuit to stop operating, while the effectiveness being a state in which only when the fixing to the low-operating frequency is instructed by the notification section, the operation-stop control section receives the request to stop the operation of the processing circuit from the setting section and causes the processing circuit to stop operating; and a third input setting section that alternatively sets, in response to the user's operation, either one of ineffectiveness and effectiveness of the voltage-reduction control section, the ineffectiveness being a state in which when the request to reduce the voltage of the electric power supplied to the processing circuit is issued from the setting section, the voltage-reduction control section receives the request irrespective of the operating frequency of the processing circuit and reduces the voltage supplied to the processing circuit, while the effectiveness being a state in which only when the fixing to the low-operating frequency is instructed by the notification section, the voltage-reduction control section reduces the voltage supplied to the processing circuit by receiving the request to stop the operation of the processing circuit from the setting section.

Sometimes it is inconvenient to reduce an operating frequency of the processing circuit even if there is no user's operation, for example, in such a case where processing intended by the user is performed indifferent to the user's operation, which processing is not background processing such as the previously mentioned file index function and execution of virus scan software. This inconvenience may be avoided by providing a function that allows the user to set effectiveness and ineffectiveness as described above.

Still more, it is also preferable that the information processing apparatus further includes: a first memory that stores, in a nonvolatile manner, first setting information in which there is alternatively set either one of ineffectiveness and effectiveness of a function of instructing the setting section by the notification section to perform the fixing to the low-operating frequency; a second memory that stores, in a nonvolatile manner, second setting information in which there is alternatively set either one of ineffectiveness and effectiveness of the operation-stop control section, the ineffectiveness being a state in which when the request to stop the operation of the processing circuit is issued from the setting section, the operation-stop control section receives the request irrespective of the operating frequency of the processing circuit and causes the processing circuit to stop operating, while the effectiveness being a state in which only when the fixing to the low-operating frequency is instructed by the notification section, the operation-stop control section receives the request to stop the operation of the processing circuit from the setting section and causes the processing circuit to stop operating; and a third memory that stores, in a nonvolatile manner, third setting information in which there is alternatively set either one of ineffectiveness and effectiveness of the voltage-reduction control section, the ineffectiveness being a state in which when the request to reduce the voltage of the electric power supplied to the processing circuit is issued from the setting section, the voltage-reduction control section receives the request irrespective of the operating frequency of the processing circuit and reduces the voltage supplied to the processing circuit, while the effectiveness being a state in which only when the fixing to the low-operating frequency is instructed by the notification section, the voltage-reduction control section receives the request to stop the operation of the processing circuit from the setting section and reduces the voltage supplied to the processing circuit.

When a use of the information processing apparatus is known, the effectiveness and ineffectiveness may be previously written on the memory in a nonvolatile manner according to the use.

Here, it is preferable in the information processing apparatus that the notification section instructs the setting section to perform fixing to a lowest frequency among the plural operation allowing frequencies, in response to an elapsed time longer than a predetermined threshold time being measured by the measuring section.

Additionally, the information processing apparatus may further include a storage section that stores an operating system as the basic software executed by the processing circuit, wherein the setting section is a function that is implemented within the information processing apparatus by execution of the operating system in the processing circuit.

Moreover, the information processing apparatus may further include a sensor that detects an approach of the user, wherein the measuring section measures an elapsed time from a last time when presence of the user is not detected by the sensor, instead of measuring the elapsed time from the user's last operation in the input section, and the notification section instructs the setting section to perform fixing to a specific low-operating frequency among the plural operation allowing frequencies, in response to an elapsed time longer than a predetermined threshold time being measured by the measuring section, and instructs the setting section to release the fixing in response to detection of the user by the sensor.

Fixing to a low-operating frequency and its releasing may be performed according to probability of operation even when operation in the input section is not yet performed by the user.

According to a second aspect of the invention, the operation control method of a processing circuit is executed in an information processing apparatus that includes the processing circuit to execute a program by operating at a set operating frequency, an input section that receives an input by a user's operation, basic software that has an operating-frequency requesting function for automatically changing the operating frequency of the processing circuit according to a processing request and setting of the basic software, the operation control method including:

a measuring step of measuring an elapsed time from the user's last operation in the input section;

a notifying step of providing notification about plural operation allowing frequencies of the processing circuit, instructing fixing to a specific low-operating frequency among the plural operation allowing frequencies in response to an elapsed time longer than a predetermined threshold time being measured in the measuring step, and instructing release of the fixing in response to the user's operation in the input section; and a setting step of selecting an operating frequency according to a processing situation in the processing circuit from among the plural operation allowing frequencies received through the notification in the notifying step thereby setting the selected operating frequency, and restarting, in response to the release of the fixing, setting of an operating frequency in the processing circuit according to a processing situation in the processing circuit selected by the basic software from among the plural operation allowing frequencies.

According to a third aspect of the invention, the operation control program of a processing circuit is executed in an information processing apparatus that includes the processing circuit to execute a program by operating at a set operating frequency, an input section that receives an input by a user's operation, and basic software that has an operating-frequency requesting function for automatically changing the operating frequency of the processing circuit according to a processing request and setting of the basic software, the operation control program implementing in the information processing apparatus:

a measuring section that measures an elapsed time from the user's last operation in the input section;

a notification section that provides notification about plural operation allowing frequencies of the processing circuit, instructs fixing to a specific low-operating frequency among the plural operation allowing frequencies in response to an elapsed time longer than a predetermined threshold time being measured by the measuring section, and instructs release of the fixing in response to the user's operation in the input section; and a setting section that selects, upon receipt of the notification about the plural operation allowing frequencies from the notification section, an operating frequency according to a processing situation in the processing circuit from among the plural operation allowing frequencies received through the notification from the notification section thereby setting the selected operating frequency, sets the low-operating frequency in the processing circuit upon being instructed by the notification section to perform the fixing to the low-operating frequency, and restarts, in response to the release of the fixing, setting of an operating frequency according to a processing situation in the processing circuit selected by the basic software from among the plural operation allowing frequencies.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

THE BEST MODE FOR CARRYING OUT THE INVENTION

Embodiments of the present invention will be described with reference to the drawings.

Figure 1:
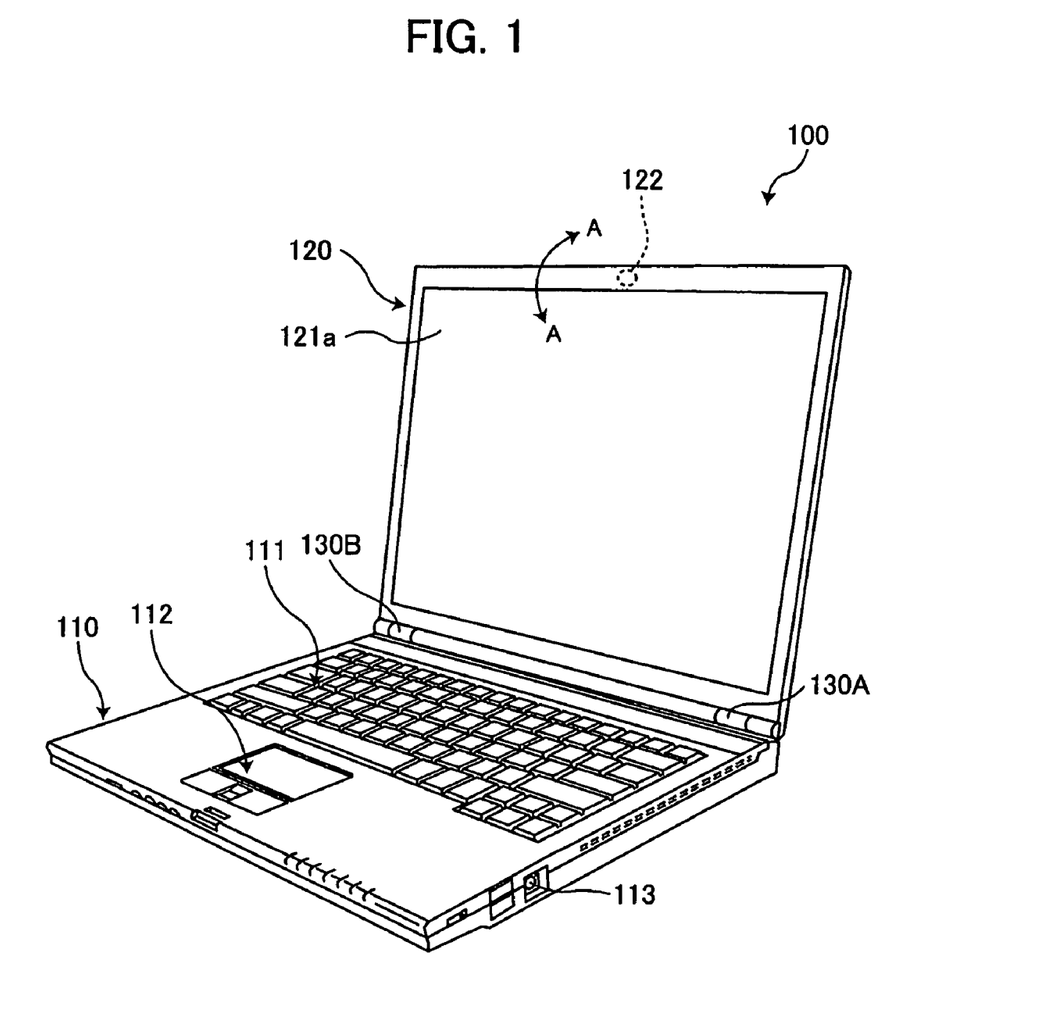
FIG. 1 is a perspective diagram illustrating an external appearance of a note PC in an open state as one embodiment of the information processing apparatus of the present invention.

FIG. 1 is a perspective diagram illustrating an external appearance of a notebook-type personal computer (hereafter, abbreviated as a "note PC") in an open state as one embodiment of the information processing apparatus of the present invention.

A note PC 100 illustrated in FIG. 1 includes a main unit 110, a display unit 120, and hinge members 130A, 130B for connecting the display unit 120 to the main unit 110 openably and closably in a direction of an arrow A-A illustrated in FIG. 1.

The main unit 110 incorporates a CPU that is one type of a processing circuit to perform computing processing by executing a BIOS, an OS that is one type of basic software, and an application program; a hard disk unit to store these programs, and a memory where a program is expanded. On a top surface of the main unit 110, there are a keyboard 111 to input an instruction according to an operation, and a trackpad 112 for moving a cursor on a display screen 121*a* by tracing the trackpad with a fingertip (described below) and specifying an icon or the like that is present at the current position of the cursor by a button operation. Additionally, on the side of the main unit 110, there are a power supply port 113 that receives power supplied from an AC adapter (not illustrated) and other plural components. However, those components are general component elements in a note PC and explanation is omitted here.

The display unit 120 has the display screen 121*a* for displaying information.

In the following, three embodiments of a first embodiment, a second embodiment and a third embodiment will be explained, and a note PC in the third embodiment is equipped with an infrared sensor 122 for detecting presence of a user in front of the note PC 100, disposed in an upper central portion of the display unit 120 in the open state illustrated in FIG. 1.

Hereafter, firstly, explanation will be made about the first embodiment that is the note PC illustrated in FIG. 1 in which the infrared sensor 122 is unnecessary.

Figure 2:
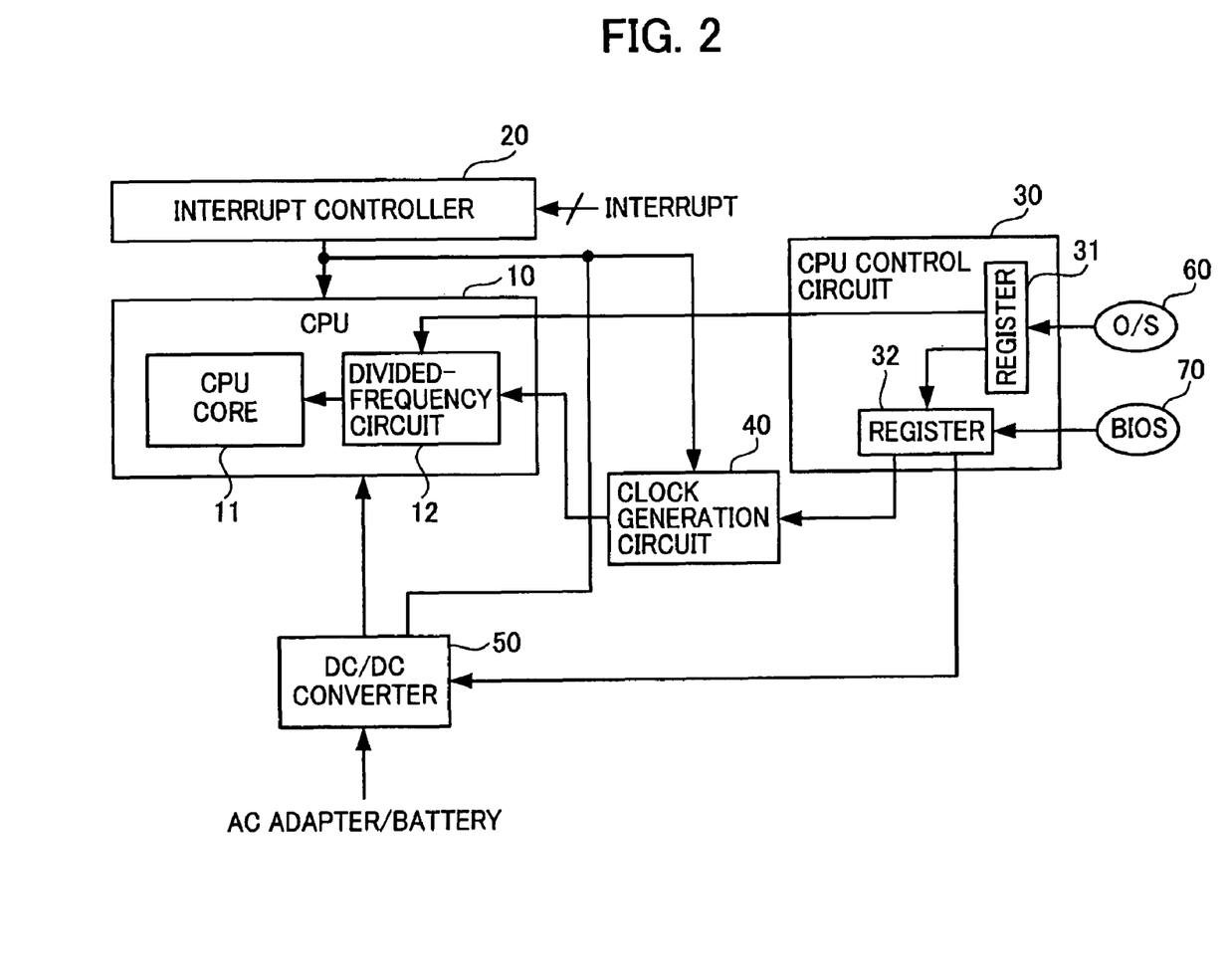
FIG. 2 is a block diagram of a CPU and circuits surrounding the CPU mounted on the note PC illustrated in FIG. 1.

FIG. 2 is a block diagram of a CPU and circuits surrounding the CPU mounted on the note PC illustrated in FIG. 1.

The note PC is mounted with an OS (Operating System) and a BIOS (Basic Input Output System). Although these OS and BIOS are illustrated as if they are independent elements, they are program types that are executed by a CPU thereby causing the note PC to perform processing. That is, the OS is basic software to connect between hardware and an application program of the PC, and the BIOS is a program that is more fundamental than the OS, allowing various settings such as operation environment setting of the PC. In the following, explanation will be described such that the O/S does something and the BIOS does something, for the sake of simplified expression.

In this FIG. 2, a CPU 10, an interrupt controller 20, a CPU control circuit 30, a clock generation circuit 40, a DC-DC converter 50, an OS 60 and a BIOS 70 are illustrated.

The CPU 10 includes a CPU core 11 and a divided-frequency circuit 12. The CPU core 11 operates by using power supplied from the DC-DC converter 50 and a clock supplied from the divided-frequency circuit 12 and executes a program. The divided-frequency circuit 12 divides a frequency of a clock supplied from the clock generation circuit 40 and supplies the clock after the frequency is divided to the CPU core 11. In the divided-frequency circuit 12, a divided-frequency ratio is controlled by an instruction from the CPU control circuit 30.

The interrupt controller 20 receives various types of interrupts and notifies the CPU 10 or the like, and also controls the clock generation circuit 40 and the DC-DC converter 50.

The CPU control circuit 30 includes a register 31 that is set by the OS 60 and a register 32 that is set by the BIOS 70. Details will be described below.

The clock generation circuit 40 is a component element that generates a source clock which serves as a basis to operate the CPU 10 and supplies it to the CPU 10. The clock generation circuit 40 stops clock generation by receiving control from the CPU control circuit 30 and restarts the clock generation by receiving control from the interrupt controller 20.

Further, the DC-DC converter 50 receives an input of DC power from an AC acceptor and a battery which are not illustrated, generates DC power and supplies the DC power to the CPU 10 and other electronic parts (not illustrated). This DC-DC converter 50 receives control from the CPU control circuit 30 as to the power to be supplied to the CPU 10, and reduces the voltage to the extent of an insufficient voltage to operate the CPU although contents of a register (not illustrated) in the CPU 10 is securely maintained, and by receiving control from the interrupt controller 20, raises the voltage to the extent of a sufficient voltage to operate the CPU 10. Incidentally, the DC-DC converter 50 also controls supply and stop of power to other electronic parts, however that control is not the subject matter here and illustration and explanation are omitted. As to the interrupt controller 20, since the interrupt controller 20 needs to operate even in a situation where the voltage of the supplying power to the CPU 10 is reduced and power supply to the other electronic parts is shut off, power supply to the interrupt controller 20 still continues.

A divided-frequency ratio of the divided-frequency circuit 12 in the CPU 10 is controlled by set contents in the register 31 of the CPU control circuit 30, and the register 31 is written by the OS 60.

That is, the divided-frequency ratio of the divided-frequency circuit 12, namely, a frequency of a clock to be supplied to the CPU core 11 (operating frequency of the CPU 10) is set by the OS 60. Details will be described below.

Also, by writing in the register 31, the OS 60 issues a request to stop clock by the clock generation circuit 40, and issues a request to reduce a voltage of power supplied to the CPU 10 by the DC-DC converter 50. However, by the contents written in the register 32 by the BIOS 70, it is determined whether the control of clock stop to the clock generation circuit 40 and the control of voltage reduction to the DC-DC converter 50 are actually performed. In other words, the BIOS 70 may determine effectiveness and ineffectiveness of the requests from the OS 60 to stop clock by the clock generation circuit 40 and to reduce voltage of power supplied to the CPU 10 by the DC-DC converter 50.

The OS 60 changes an operating frequency of the CPU 10 so as to be suitable to processing traffic according to a situation each time, from among plural operating allowing frequencies notified of from the BIOS 70, which is described below, and according to each situation at each time, issues a request to stop the operation of the CPU 10, namely, to stop clock generation by the clock generation circuit 40 and to reduce a voltage of the power supplied to the CPU 10 by the DC-DC converter 50. However, execution of the requests to the clock generation circuit 40 and the DC-DC converter 50 are handled by the BIOS 70.

Figure 3:
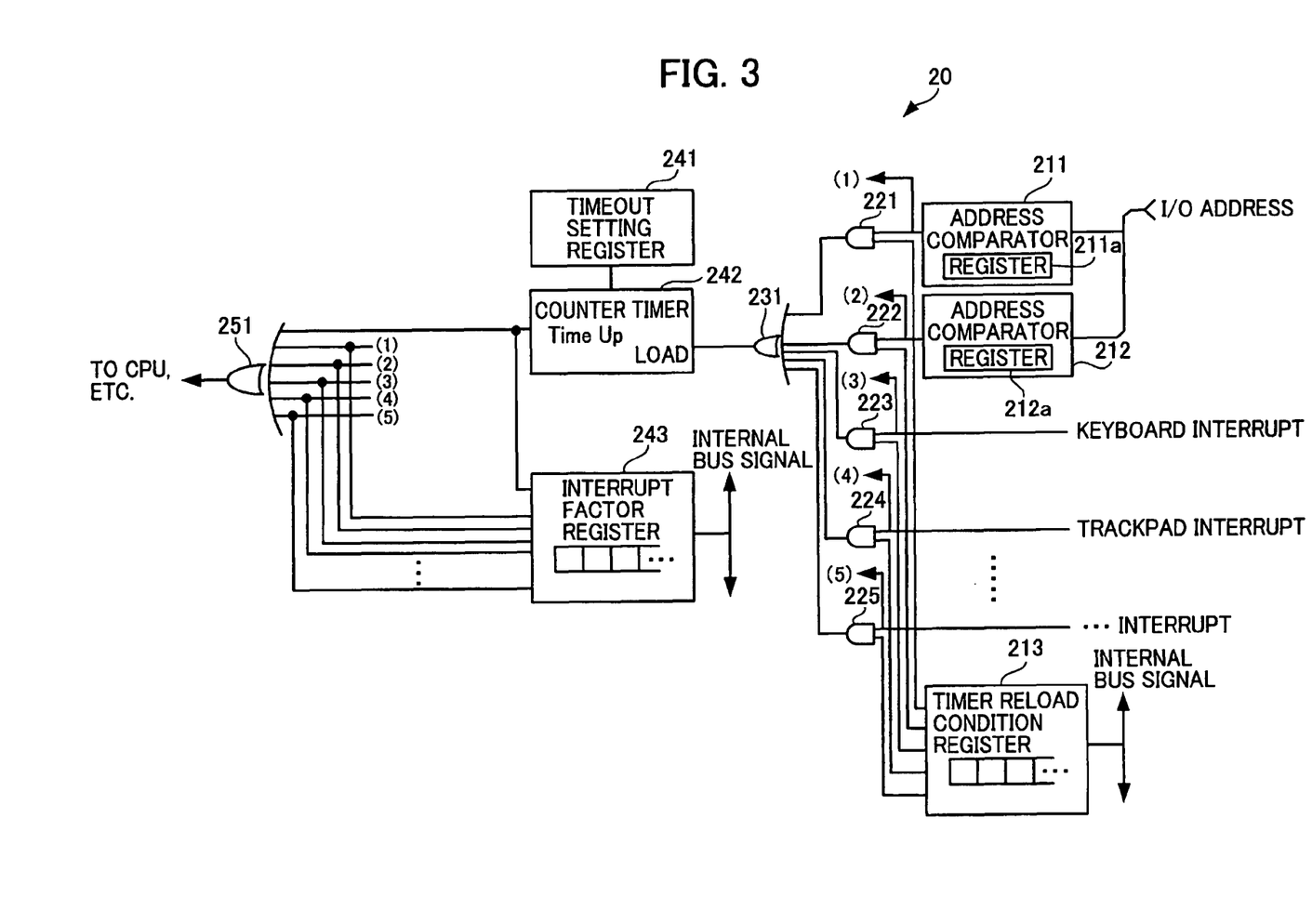
FIG. 3 is a block diagram illustrating an internal configuration of an interrupt controller illustrated in FIG. 2.

FIG. 3 is a block diagram illustrating an internal configuration of the interrupt controller illustrated in FIG. 2.

The interrupt controller 20 illustrated in FIG. 3 includes two address comparators 211, 212; a timer reload condition register 213; plural (here, 5) AND gates 221-225; one OR gate 231; a timeout setting register 241; a counter timer 242; an interrupt factor register 243; and one more OR gate 251.

The address comparators 211, 212 store an I/O (Input and Output) address in registers 211*a*, 212*a*, input an I/O address accessed by the CPU 10 and when the both I/O addresses match, output a match signal.

A "keyboard interrupt" is an interrupt signal that is generated when the keyboard 111 (see FIG. 1) is operated. A "trackpad interrupt" is an interrupt signal that is generated when the trackpad 112 (see FIG. 1) is operated. Incidentally, an interrupt is generated by other various conditions, and here, they are abbreviated as ". . . interrupt".

In the interrupt controller 20 illustrated in FIG. 3, an elapsed time is measured from a time point when a certain type of interrupt ceases occurring (for example, after the keyboard 111 ceases being operated). The timer reload condition register 213 is a register for the BIOS to previously store a target to measure an elapsed time as to a type of interrupt, from among many types of interrupts (including output of a match signal to be outputted from the address comparators 211, 212).

The reason why the address comparators 211, 212 are provided is to recognize that an I/O device, for instance, a printer and another particular device is accessed and to include an elapsed time from a timing at which last access to the I/O device ends as a measuring object.

Here, in the timer reload condition register 213, the BIOS 70 sets (stores) that operations of the keyboard 111 and the trackpad 112 are objects to measure an elapsed time. Here, when recognized that a mouse as an external device is attached to the note PC illustrated in FIG. 1, the BIOS 70 sets that a mouse interrupt generated by operating the mouse also as a measuring target of elapsed time, in the timer reload condition register 213.

A piece of interrupt information of the elapsed time measuring target that is set in the timer reload condition register 213 (here, the targets are represented by the keyboard and the trackpad) is transmitted to each AND gate 211-215 for each type of interrupt and when a keyboard interrupt or a trackpad interrupt occurs, the interrupt signal is inputted into the counter timer 242 by passing through the AND gate 223 or the AND gate 224, and further passing through the OR gate 231.

Each time the interrupt signal having passed through the OR gate 231 is inputted into the counter timer 242, a set value corresponding to a threshold time which is previously set to the timeout setting register 241 is loaded by the BIOS 70. The count timer 242 counts down the loaded set value at regular time intervals, and outputs an interrupt signal to notify that the threshold time has elapsed when the value reaches zero.

Various types of interrupt signals including the interrupt signal outputted from the counter timer 242 are outputted from the interrupt controller 20 through the OR gate 251, and as illustrated in FIG. 2, transmitted to the CPU 10, the clock generation circuit 40 and the DC-DC converter 50 as well as to the interrupt factor register 243 in the interrupt controller 20. In the interrupt factor register 243, a factor of the generated interrupt (for example, interrupt of the keyboard origin) is stored.

When the generation of interrupt is transmitted from the interrupt controller 20 to the CPU 10, the CPU 10 refers to the interrupt factor register 243 to recognize from which factor the interrupt occurs and operates according to the factor.

It is also possible to configure the CPU 10 such that the CPU 10 regularly monitors the interrupt factor register 243 to recognize that the interrupt is not from the interrupt controller 20 but because of a factor in the interrupt factor register 243 and operates according to the factor.

The reason why the interrupt signal outputted from the interrupt controller 20 is transmitted to the clock generation circuit 40 and the DC-DC converter 50 is, in a situation where an interrupt of some kind occurs while the clock generation circuit 40 stops clock generation and the DC-DC converter 50 reduces a voltage of power supplied to the CPU 10 or stops power supply to another electronic device, to restart the clock generation and the power supply (including increase of the voltage to the CPU 10) coinciding with the occurrence of the interrupt. Additionally, when the clock generation is stopped or the voltage of supplying power is lowered, the recognition of occurrence of interrupt in the CPU 10 is performed after the clock generation is restarted and the voltage is raised, and after the operation of the CPU 10 becomes stable again.

Figure 4A:
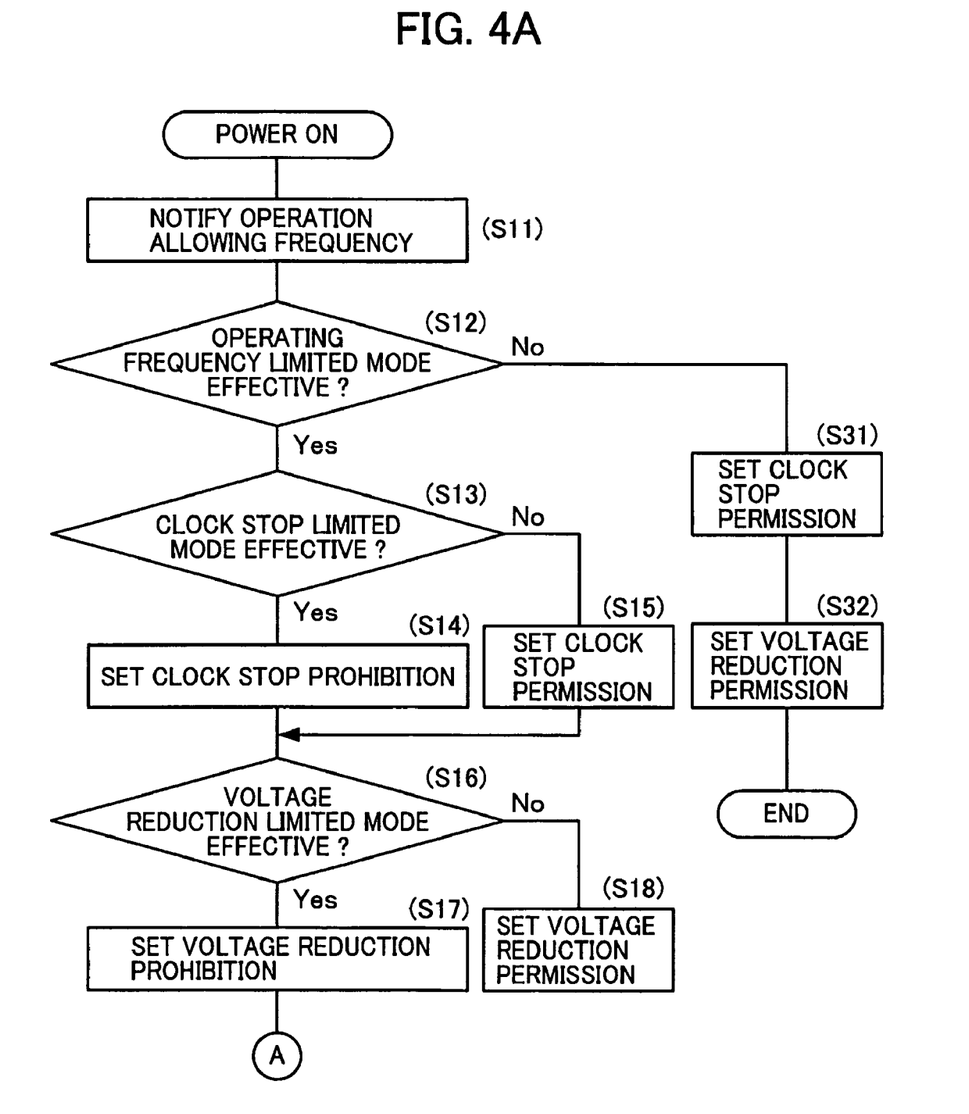
FIGS. 4A and 4B illustrate a former part and a latter part, respectively, of a flow of environment setting in the note PC through BIOS.
Figure 4B:
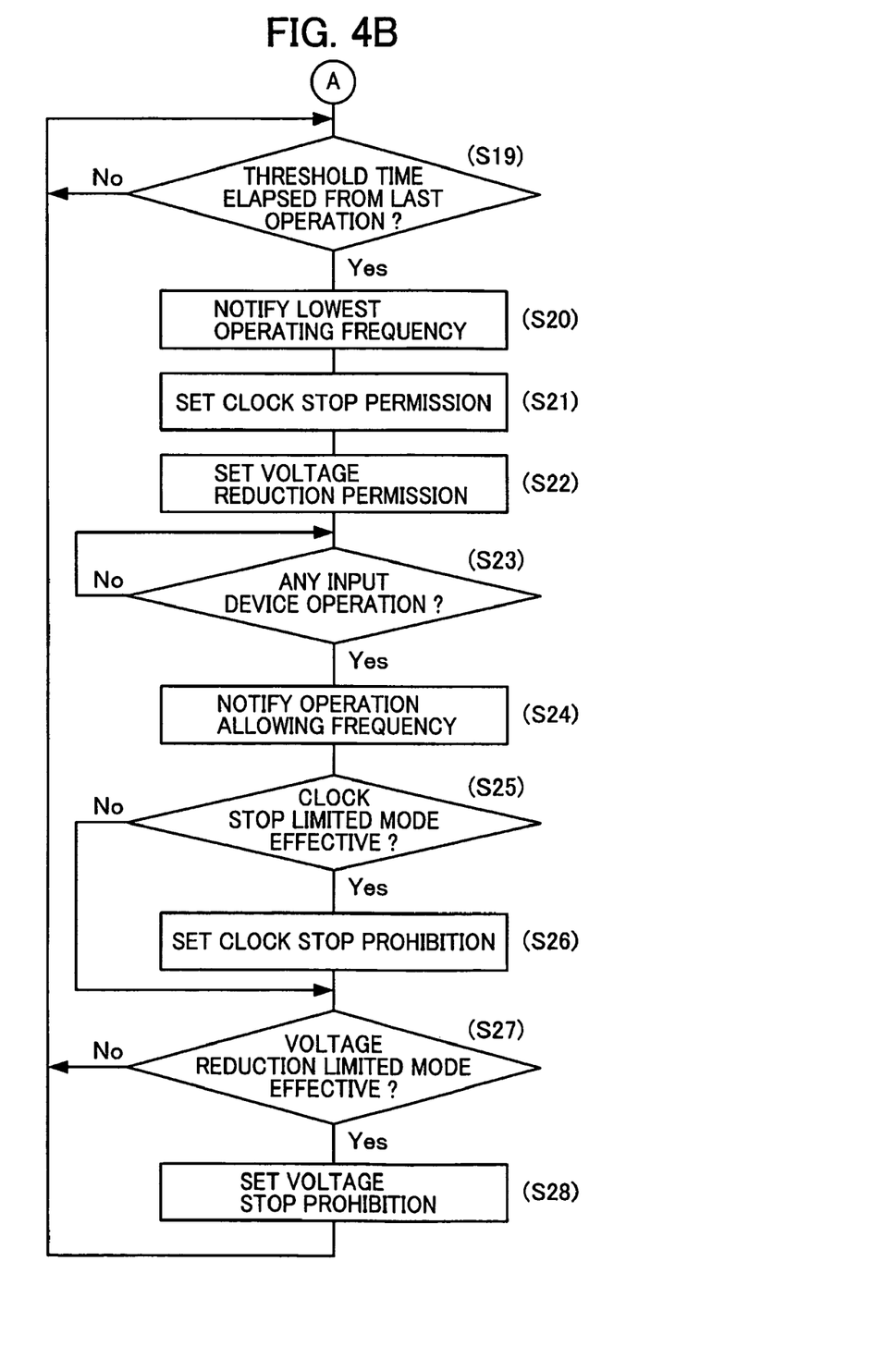

FIGS. 4A and 4B illustrate a former part and a latter part, respectively, of a flow of environment setting in the note PC through BIOS. Note that only set elements particular to the present embodiment are illustrated here.

When the power of this note PC is turned on, firstly, the BIOS notifies the OS of an operation allowing frequency (step S11). Hereafter, this step S11 will be explained in detail.

Figure 5A:
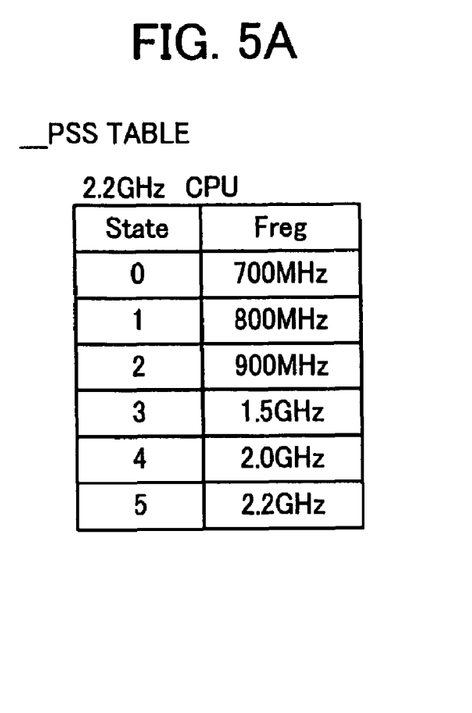
FIGS. 5A and 5B illustrate PSS tables.
Figure 5B:
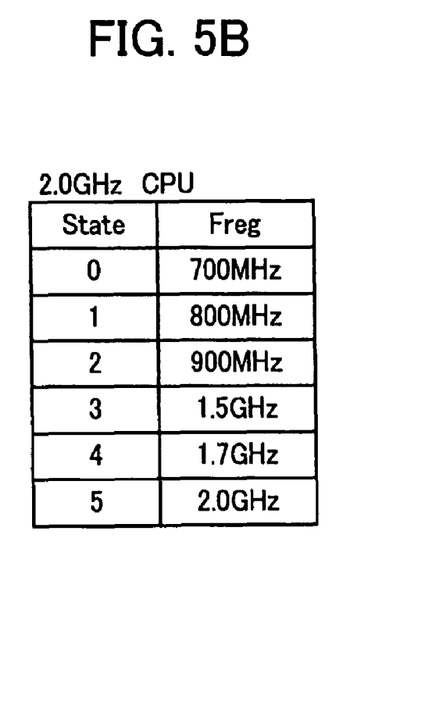

FIGS. 5A and 5B illustrate _PSS tables.

The _PSS tables are included in the BIOS, and here, a list of the operation allowing frequency is illustrated for each CPU type.

Figure 6:
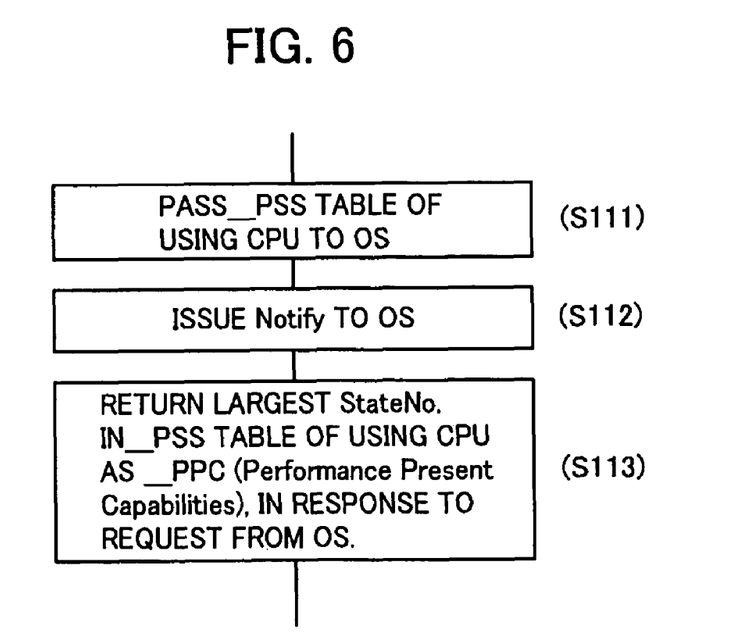
FIG. 6 illustrates a detailed flow of step S11 illustrated in FIG. 4A.

FIG. 6 illustrates a detailed flow of step S11 illustrated in FIG. 4A.

Here, firstly, a _PSS table corresponding to a CPU used in this note PC is passed to the OS from the BIOS (step S111), subsequently a Notify is issued to the OS from the BIOS (step S112). This'Notify expresses an instruction that since there is a piece of information to be passed to the OS, come to receive the piece of information at a convenient timing for the OS.

Further in step S113, in response to the request to supply information from the OS, the BIOS passes a StateNo. expressing a largest frequency to allow operation in the _PSS table that is already passed in step S111 to the OS as _PPC (Performance Present Capabilities). For example, when the _PSS table illustrated in FIG. 5A is passed to the OS and further when StateNo. 4 is passed as the _PPC, the OS recognizes that frequencies in the range of StateNo. 0 to StateNo. 4 are the operation allowing frequencies at which operation is currently allowed.

Returning to FIG. 4A, explanation continues.

When the step of notifying an operation allowing frequency (step S11) ends, subsequently, it is determined whether an operating frequency limited mode is effective or ineffective (step S12). Here, along with the operating frequency limited mode, a clock stop limited mode in step S13 and a voltage reduction limited mode in step S16 will be explained as well.

Figure 7:
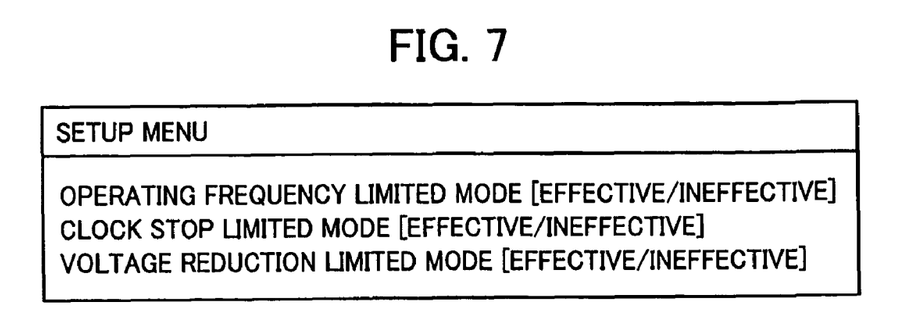
FIG. 7 illustrates a mode-setting screen'in a BIOS setup menu.

FIG. 7 illustrates a mode setting screen in BIOS setup menu.

A user opens to this mode setting screen to set effective or ineffective for the operating frequency limited mode, the clock stop limited mode and the voltage reduction limited mode, respectively.

The operating frequency limited mode is a mode for determining whether the operating frequency of the CPU is limited (effective) or not limited (ineffective) when the timer counter 42 in the interrupt controller 20 illustrated in FIG. 2 outputs an interrupt signal at the conclusion of the threshold time (time-up). When the operating frequency limited mode is set to "effective", the operation allowing frequency of the CPU at the time-up of the timer counter 242 is fixed to the StateNo. 0 (lowest operating frequency) in the PSS table that is already passed to the OS.

The clock stop limited mode is a mode for determining whether, when there is a request from the OS to stop clock generation in the clock generation circuit 40 illustrated in FIG. 2, the request is received only when the operating frequency limited mode is set to effective and also when the operating frequency of the CPU is fixed to the lowest operating frequency (effective); or the request is received indifferent to the operating frequency of the CPU (ineffective). When the clock stop limited mode is set to "effective", it sets such that the request from the OS to stop clock generation is received only when the operating frequency of the CPU is fixed to the lowest operating frequency, whereas when the fixing is released, the request from the OS to stop clock generation is not received. This setting is performed by the BIOS by writing in the register 32 of the CPU control circuit 30 illustrated in FIG. 2.

Furthermore, the voltage reduction limited mode is a mode for determining whether, when there is a request from the OS to reduce a voltage of the power supplied to the CPU 10 by the DC-DC converter 50 illustrated in FIG. 2, the request is received only when the operating frequency limited mode is set to effective and also when the operating frequency of the CPU is fixed to the lowest operating frequency (effective); or the request is received indifferent to the operating frequency of the CPU (ineffective). When the voltage reduction limited mode is set to "effective", it sets such that the request from the OS to reduce the voltage of the CPU is received only when the operating frequency of the CPU is fixed to the lowest operating frequency, whereas when the fixing is released, the request from the OS to reduce the voltage of the CPU is not received. This setting is performed by the BIOS by writing in the register 32 of the CPU control circuit 30 illustrated in FIG. 2, similar to the case of the clock stop limited mode.

The piece of information of effectiveness or ineffectiveness that is set on the menu screen illustrated in FIG. 7 is stored as setup information in the BIOS and referred to by the BIOS.

Again returning to FIG. 4A and the explanation continues.

In step S12, the operating frequency limited mode is determined to be effective or ineffective, and when determined to be ineffective, the notification of the operation allowing frequency is performed in step S11, followed by setting of clock stop permission and voltage reduction permission and the flow ends (step S31, S32). The setting of clock stop permission and voltage reduction permission is identical to step S15 and step S18, respectively, so that explanation is omitted here and made in step S15 and step S18.

When determined that the operating frequency limited mode is set to "effective" in step S12, then it is determined whether or not the clock stop limited mode is "effective" (step S13), and when determined to be "effective", clock stop prohibition is set to the register 32 in the CPU control circuit 30 illustrated in FIG. 2 (step S14), whereas when determined to be "ineffective", clock stop permission is set to the register 32 (step S15). In some cases, a request to stop clock may be written in the other register 31 by the OS 60. In such cases, even if the request to stop clock is written in the register 31, when clock stop prohibition is set to the register 32, clock generation continues. Whereas, when clock stop permission is set to the register 32, if a request to stop clock is written by the OS in the register 31, an instruction to stop clock is issued to the clock generation circuit 40 and the clock generation is stopped.

Next, in step S16 in FIG. 4A, it is determined whether or not the voltage reduction limited mode is set to "effective". When determined to be "effective", similarly to the case of clock stop prohibition or clock stop permission, prohibition of CPU voltage reduction is set to the register 32 in the CPU control circuit 30 illustrated in FIG. 2 (step S17), and the flow proceeds to step S19 in FIG. 4B. Whereas when determined to be "ineffective" in step S16 in FIG. 4A, permission of CPU voltage reduction is set to the register 32 (step S18) and the flow proceeds to step S19 in FIG. 4B.

In some cases, a request to reduce a CPU voltage may be written in the other register 31 by the OS 60. In such cases, even if the request to reduce the CPU voltage is written in the register 31, when the voltage reduction prohibition is set to the register 32, the voltage of the CPU is not reduced and the power is continuously supplied at a voltage level to secure correct operation of the CPU. On the other hand, when the CPU voltage reduction permission is set to the register 32, and if a request to reduce the CPU voltage is written in the register 31 by the OS, the DC-DC converter 50 is instructed to reduce the voltage of power supplied to the CPU and the voltage of power supplied to the CPU is reduced.

Next, in step S19 illustrated in FIG. 4B, it is determined whether a threshold time has elapsed from a last operation of the I/O (here, the keyboard and the trackpad).

Passing of the threshold time is determined by whether or not an interrupt by the time-up of the counter timer 242 illustrated in FIG. 3 occurs.

If the threshold time has elapsed from the last operation, a lowest operating frequency is notified of to the OS (step S20 in FIG. 4B).

Figure 8:
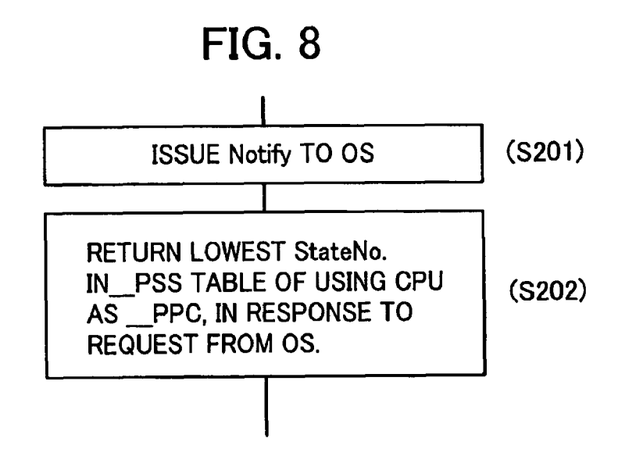
FIG. 8 illustrates a detailed flow of step S20 illustrated in FIG. 4B.

FIG. 8 illustrates a detailed flow of step S20 illustrated in FIG. 4B.

Here, in the same manner as in step S11 (see FIG. 6) illustrated in FIG. 4A, a Notify is issued to the OS (step S201), and in response to a request from the OS, a StateNo. expressing a lowest operating frequency in a _PSS table that is already passed to the OS is returned to the OS as a _PPC. The OS receives the StateNo. and fixes the operating frequency of the CPU to the lowest operating frequency.

Returning to FIG. 4B and the explanation continues.

In step S21, permission is set to the request from the OS to stop clock, and in step S22, permission is set to the request from the OS to reduce the voltage of power supplied to the CPU. These steps S21, S22 exercise substantial significance only when the clock stop limited mode and the voltage reduction limited mode are set to "effective". This is because if the clock stop limited mode and the voltage reduction limited mode are firstly set to ineffective, then permission is already set in step S15 and S18, so that what is set in these steps S21, S22 is nothing but overwrite of the permission.

Next, operation of the input device (here, the keyboard and the trackpad) is monitored (step S23), and if there is any operation, notification of the operation allowing frequency is performed to the OS (step S24).

Figure 9:
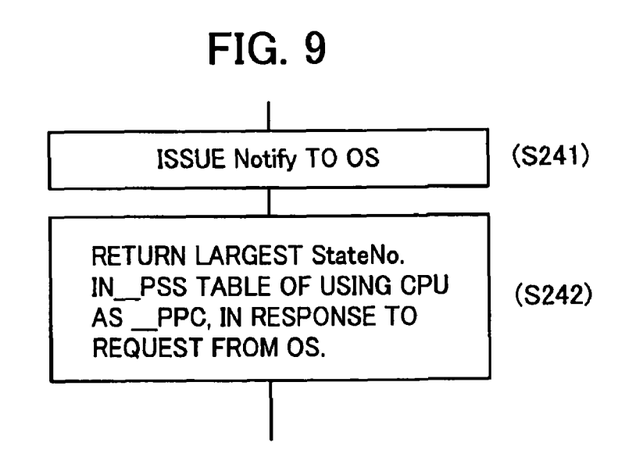
FIG. 9 illustrates a detailed flow of step S24 illustrated in FIG. 4B.

FIG. 9 illustrates a detailed flow of step S24 illustrated in FIG. 4B.

Also here, firstly, a Notify is issued to the OS (step S241), and in accordance with a request from the OS, a StateNo. expressing a largest frequency to allow operation in the _PSS table of the using CPU, which is already passed to the OS, is returned to the OS as a PPC. When the PSS table illustrated in FIG. 5A is already passed to the O/S, and if StateNo. 4 is passed, the OS recognizes that there are five operation allowing frequencies of StateNo. 0 to StateNo. 4 and dynamically sets one operating frequency from among these five operation allowing frequencies according to a processing situation of each time and the CPU operates at the set operating frequency.

This setting of operating frequency is performed by writing from the OS 60 in the register 31 in the CPU control circuit 30 illustrated in FIG. 2. A piece of information expressing the operating frequency of the CPU written in the register 31 is transmitted to the divided-frequency circuit 12 in the CPU 10, and the divided-frequency circuit 12 is adjusted so as to output a clock of the set operating frequency from the divided-frequency circuit 12.

Moreover, in step S25 illustrated in FIG. 4B, it is determined whether or not the clock stop limited mode is set to "effective", and when set to "effective", prohibition of clock stop is set (step S26). Further, it is determined whether or not the voltage reduction limited mode is set to "effective" (step S27), and when set to "effective", prohibition of voltage reduction of the CPU is set (step S28). After that, the flow returns to step S19. If the voltage reduction limited mode is set to ineffective, the flow returns from step S27 to step S19 to repeat the same processing as described above.

Note that, although it is explained in step S20 that the operating frequency is fixed to the lowest frequency in the _PSS table that is already passed to the OS, it is not necessarily to be fixed to the lowest frequency if power consumption is in a range of specifications, and the operating frequency may be fixed to, for example, a second slowest frequency.

Here, although it is configured such that effectiveness and ineffective of the clock stop limited mode and those of the voltage reduction limited mode are set separately, it is also possible to combine these, for example, into a "deep sleep mode" so that both the clock stop and the CPU voltage reduction may be controlled together by setting effectiveness and ineffectiveness of the deep sleep mode.

Still more, here, the explanation is made by taking the keyboard and the trackpad as examples of the I/O devices that are monitored to fix the frequency of the CPU clock, and explained that when an external mouse is attached, the mouse is monitored as well. However, it is also possible to include another I/O apparatus other than these devices according to usage of the note PC, for example, such as various types of sensors and a printer, as a target to fix the CPU clock to a lower frequency when a predetermined time has elapsed without an interruption of these I/O devices.

Although the above-mentioned first embodiment is an example of setting effectiveness and ineffectiveness of the operating frequency limited mode, the clock stop limited mode and the voltage reduction limited mode by user's operation, it is also possible to store these settings as configuration data of the BIOS prior to shipment of the note PC, if usage of the note PC is known beforehand.

In the following, a second embodiment constructed as such will be explained.

Figure 10A:
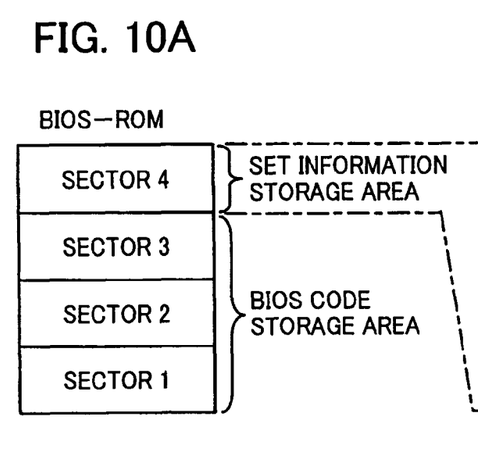
FIGS. 10A and 10B illustrate an address map of a BIOS-ROM in which the BIOS is stored.
Figure 10B:
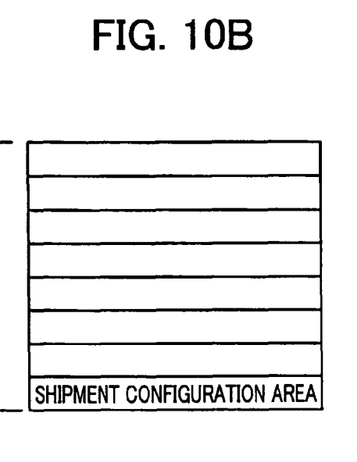

FIGS. 10A and 10B illustrate an address map of a BIOS-ROM in which the BIOS is stored.

As illustrated in FIG. 10A, BIOS codes are stored in areas of sector 1 through sector 3 in the BIOS-ROM, and setting information of the BIOS is stored in sector 4. In a portion of the set information storage area, a shipment configuration area that is written in a final stage prior to shipment is provided.

Figure 11:
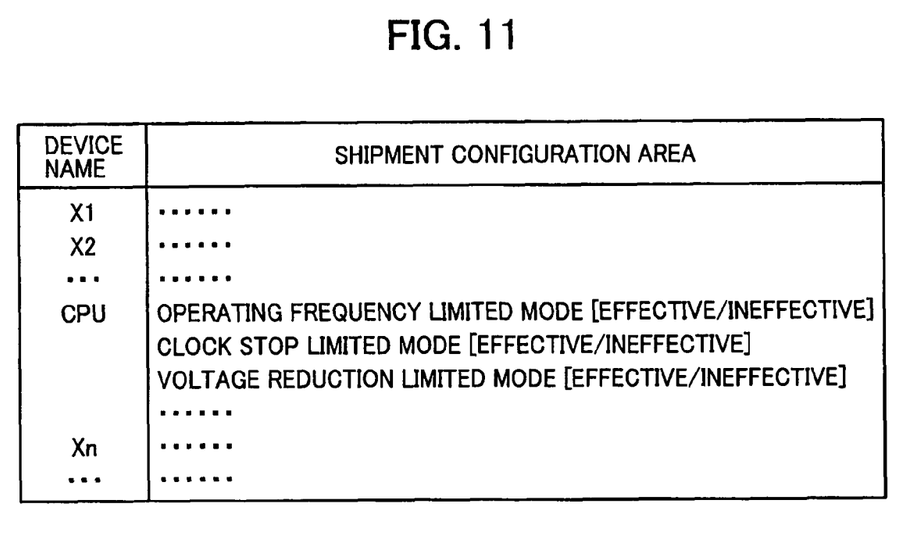
FIG. 11 illustrates apiece of shipment configuration data that is stored in a shipment configuration area.

FIG. 11 illustrates a piece of shipment configuration data that is stored in the shipment configuration area.

X1, X2, . . . , Xn express various types of devices constituting the note PC, and configuration data necessary for each device is to be written. As characteristic to the present embodiment, setting information indicating effectiveness and ineffectiveness of the operating frequency limited mode, the clock stop limited mode, and the voltage reduction limited mode is stored as configuration data of the CPU that is one of the devices.

The setting information stored here is referred to in steps S12, S13, S16 in FIG. 4A, and steps S25, S27 in FIG. 4B.

The second embodiment is different from the previously described first embodiment only on the above-mentioned point, and the other points are similar to the first embodiment, so that redundant explanation is omitted.

Note that the present invention may be one that combines the first embodiment and the second embodiment together, in which setting information of effectiveness and ineffectiveness stored in the BIOS configuration data is provided as initial setting and the user is allowed to change the effectiveness and ineffectiveness.

Next, a third embodiment of the present invention will be explained.

In the third embodiment, a note PC mounted with the infrared sensor 122 for detecting the presence of the user illustrated by broken lines in FIG. 1 is employed.

Here, only a difference from the previously described first embodiment will be explained.

Figure 12:
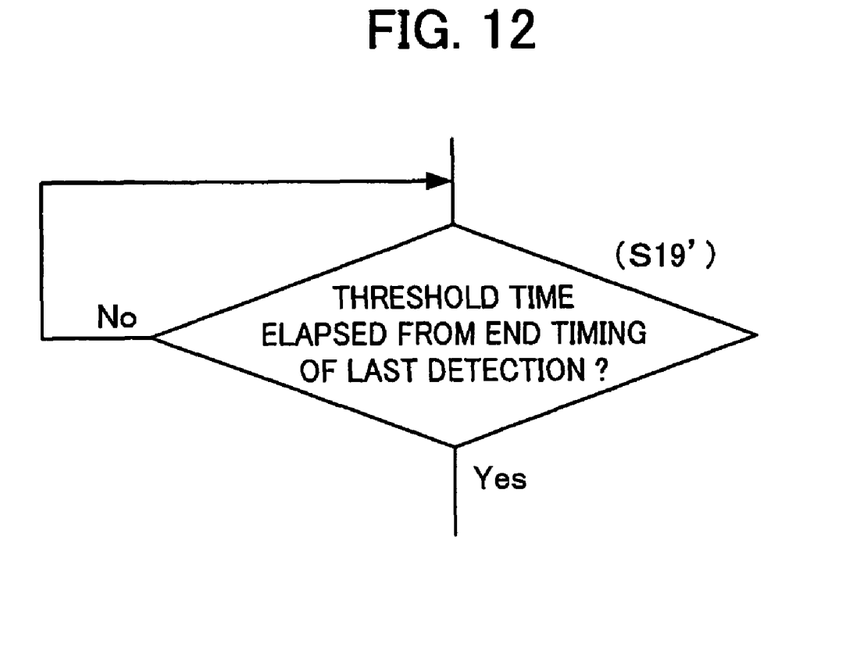
FIG. 12 illustrates a step in a third embodiment, in place of step S19 illustrated in FIG. 4B.

FIG. 12 illustrates a step S19' in the third embodiment, in place of step S19 illustrated in FIG. 4B.

In step S19 in FIG. 4B, a determination is made about whether or not a threshold time has elapsed from a last operation. Here, in stead of this, a determination is made about whether or not a threshold time has elapsed by starting measurement of time from end timing of the user's last detection by the infrared sensor 122. A circuit for this determination may be configured by, for example, removing the component elements present on the right side of the OR circuit 231 in FIG. 3 and inputting a signal expressing a timing at which the user ceases being detected from a state where the user has been detected by the infrared sensor 122, to the timer counter 242. So further illustration and explanation are omitted here to avoid redundant explanation.

Figure 13:
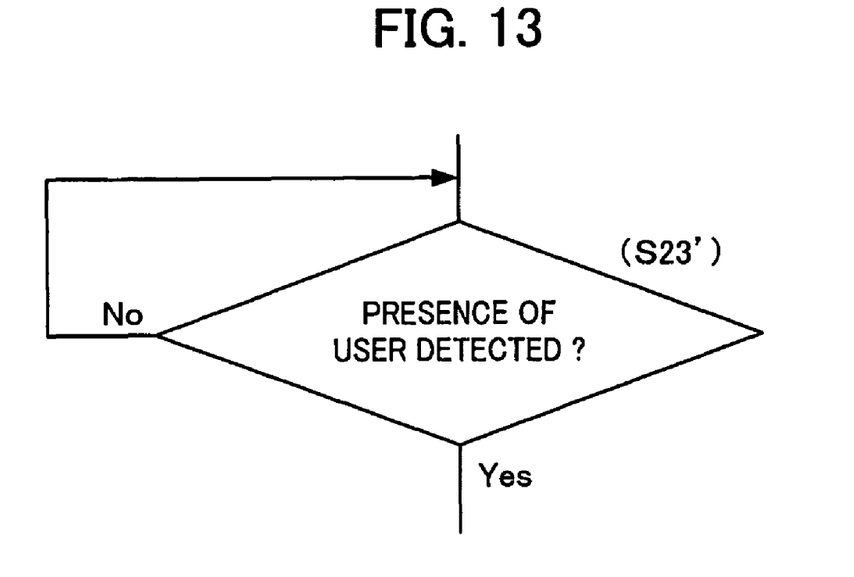
FIG. 13 illustrates a step in the third embodiment, in place of S23 illustrated in FIG. 4B.

FIG. 13 illustrates a step S23' in the third embodiment, in place of S23 in FIG. 4B.

In step S23 in FIG. 4B, a determination is made whether there is any input in the input device (for example, keyboard). However, in step S23' illustrated in FIG. 13, a determination is made whether or not the user is detected by the infrared sensor 122 instead.

A difference in this third embodiment from the previously described first embodiment is only on the above-mentioned point and the other points are similar to the first embodiment, so that the redundant explanation is omitted.

Here, the first embodiment and the third embodiment are not incompatible to each other, and the present invention may be one that integrates them. Besides, the second embodiments may be integrated as well.

Note that, here, although the explanation is made by taking the note PC as an example, the present invention is not limited to the note PC, and may be applied to a desktop type PC and other computers, or may be generally applied to an information processing apparatus mounted with a CPU to execute a program and an operating frequency of the CPU dynamically changes, even if the information processing apparatus may not be called as a computer in general.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention (s) has (have) been described in detail, it should be understood that the various changes, substitutions, and alterations could be made hereto without departing from the spirit and scope of the invention.

What is claimed is:

1. An information processing apparatus, including,
a processing circuit that executes a program by operating at a set operating frequency,
an input section that receives an input by a user's operation,
basic software that has an operating-frequency requesting function for automatically changing the operating frequency of the processing circuit according to a processing request and setting of the basic software;

a setting section that sets the operating frequency in the processing circuit, and a notification section that notifies the setting section of a plurality of operation allowing frequencies of the processing circuit, wherein the setting section selects an operating frequency according to a processing situation in the processing circuit from among the plurality of operation allowing frequencies received through notification from the notification section and sets the selected operating frequency in the processing circuit, and the processing circuit operates at the operating frequency set by the setting section, the information processing apparatus comprises:

a measuring section that measures an elapsed time from the user's last operation in the input section, the notification section instructs, in response to an elapsed time longer than a predetermined threshold time being measured by the measuring section, the setting section to perform fixing to a specific low-operating frequency among the plurality of operation allowing frequencies, and instructs the setting section to release the fixing in response to the user's operation in the input section, and the setting section sets the low-operating frequency in the processing circuit, upon being instructed to perform the fixing to the low-operating frequency, and restarts setting of an operating frequency according to a processing situation in the processing circuit selected by the basic software from among the plurality of operation allowing frequencies, upon being instructed to release the fixing.

2. The information processing apparatus according to claim 1, wherein the setting section performs issuing of a request to stop the operation of the processing circuit according to a processing situation in the processing circuit, in addition to setting of the operating frequency in the processing circuit, and the information processing apparatus further comprises an operation-stop control section that receives the request to stop the operation of the processing circuit from the setting section thereby causing the processing circuit to stop operating, only when the fixing to the low-operating frequency is instructed by the notification section.

3. The information processing apparatus according to claim 1, wherein the setting section performs issuing of a request to reduce a voltage of electric power supplied to the processing circuit according to a processing situation in the processing circuit, in addition to setting of the operating frequency in the processing circuit, and the information processing apparatus further comprises a voltage-reduction control section that reduces a voltage supplied to the processing circuit by receiving the request to stop the operation of the processing circuit from the setting section, only when the fixing to the low-operating frequency is instructed by the notification section.

4. The information processing apparatus according to claim 1, further comprising a first input setting section that alternatively sets, in response to the user's operation, either one of ineffectiveness and effectiveness of a function of instructing the setting section by the notification section to perform the fixing to the low-operating frequency.

5. The information processing apparatus according to claim 2, further comprising a second input setting section that alternatively sets, in response to the user's operation, either one of ineffectiveness and effectiveness of the operation-stop control section, the ineffectiveness being a state in which when the request to stop the operation of the processing circuit is issued from the setting section, the operation-stop control section receives the request irrespective of the operating frequency of the processing circuit and causes the processing circuit to stop operating, while the effectiveness being a state in which only when the fixing to the low-operating frequency is instructed by the notification section, the operation-stop control section receives the request to stop the operation of the processing circuit from the setting section and causes the processing circuit to stop operating.

6. The information processing apparatus according to claim 3, further comprising a third input setting section that alternatively sets, in response to the user's operation, either one of ineffectiveness and effectiveness of the voltage-reduction control section, the ineffectiveness being a state in which when the request to reduce the voltage of the electric power supplied to the processing circuit is issued from the setting section, the voltage-reduction control section receives the request irrespective of the operating frequency of the processing circuit and reduces the voltage supplied to the processing circuit, while the effectiveness being a state in which only when the fixing to the low-operating frequency is instructed by the notification section, the voltage-reduction control section reduces the voltage supplied to the processing circuit by receiving the request to stop the operation of the processing circuit from the setting section.

7. The information processing apparatus according to claim 1, further comprising a first memory that stores, in a nonvolatile manner, first setting information in which there is alternatively set either one of ineffectiveness and effectiveness of a function of instructing the setting section by the notification section to perform the fixing to the low-operating frequency.

8. The information processing apparatus according to claim 2, further comprising a second memory that stores, in a nonvolatile manner, second setting information in which there is alternatively set either one of ineffectiveness and effectiveness of the operation-stop control section, the ineffectiveness being a state in which when the request to stop the operation of the processing circuit is issued from the setting section, the operation-stop control section receives the request irrespective of the operating frequency of the processing circuit and causes the processing circuit to stop operating, while the effectiveness being a state in which only when the fixing to the low-operating frequency is instructed by the notification section, the operation-stop control section receives the request to stop the operation of the processing circuit from the setting section and causes the processing circuit to stop operating.

9. The information processing apparatus according to claim 3, further comprising a third memory that stores, in a nonvolatile manner, third setting information in which there is alternatively set either one of ineffectiveness and effectiveness of the voltage-reduction control section, the ineffectiveness being a state in which when the request to reduce the voltage of the electric power supplied to the processing circuit is issued from the setting section, the voltage-reduction control section receives the request irrespective of the operating frequency of the processing circuit and reduces the voltage supplied to the processing circuit, while the effectiveness being a state in which only when the fixing to the low-operating frequency is instructed by the notification section, the voltage-reduction control section receives the request to stop the operation of the processing circuit from the setting section and reduces the voltage supplied to the processing circuit.

10. The information processing apparatus according to claim 1, wherein the notification section instructs the setting section to perform fixing to a lowest frequency among the plurality of operation allowing frequencies, in response to an elapsed time longer than a predetermined threshold time being measured by the measuring section.

11. The information processing apparatus according to claim 1, further comprising a storage section that stores an operating system as the basic software executed by the processing circuit, wherein the setting section is a function that is implemented within the information processing apparatus by execution of the operating system in the processing circuit.

12. The information processing apparatus according to claim 1, further comprising a sensor that detects an approach of the user, wherein the measuring section measures an elapsed time from a last time when presence of the user is not detected by the sensor, instead of measuring the elapsed time from the user's last operation in the input section, and the notification section instructs the setting section to perform fixing to a specific low-operating frequency among the plurality of operation allowing frequencies, in response to an elapsed time longer than a predetermined threshold time being measured by the measuring section, and instructs the setting section to release the fixing in response to detection of the user by the sensor.

13. The information processing apparatus according to claim 1, wherein the processing circuit is a CPU.

14. An operation control method of controlling operation of a processing circuit executed in an information processing apparatus that includes the processing circuit that executes a program by operating at a set operating frequency, an input section that receives an input by a user's operation, basic software that has an operating-frequency requesting function for automatically changing the operating frequency of the processing circuit according to a processing request and setting of the basic software, the operation control method comprising:

a measuring step of measuring an elapsed time from the user's last operation in the input section;

a notifying step of providing notification about a plurality of operation allowing frequencies of the processing circuit, instructing fixing to a specific low-operating frequency among the plurality of operation allowing frequencies in response to an elapsed time longer than a predetermined threshold time being measured in the measuring step, and instructing release of the fixing in response to the user's operation in the input section; and a setting step of selecting an operating frequency according to a processing situation in the processing circuit from among the plurality of operation allowing frequencies received through the notification in the notifying step thereby setting the selected operating frequency, and restarting, in response to the release of the fixing, setting of an operating frequency in the processing circuit according to a processing situation in the processing circuit selected by the basic software from among the plurality of operation allowing frequencies.

15. A non-transitory storage medium storing an operation control program that is executed in an information processing apparatus that includes a processing circuit that executes a program by operating at a set operating frequency, an input section that receives an input by a user's operation, and basic software that has an operating-frequency requesting function for automatically changing the operating frequency of the processing circuit according to a processing request and setting of the basic software, the operation control program implementing in the information processing apparatus:

a measuring section that measures an elapsed time from the user's last operation in the input section;

a notification section that provides notification about a plurality of operation allowing frequencies of the processing circuit, instructs fixing to a specific low-operating frequency among the plurality of operation allowing frequencies in response to an elapsed time longer than a predetermined threshold time being measured by the measuring section, and instructs release of the fixing in response to the user's operation in the input section; and a setting section that selects, upon receipt of the notification about the plurality of operation allowing frequencies from the notification section, an operating frequency according to a processing situation in the processing circuit from among the plurality of operation allowing frequencies received through the notification from the notification section thereby setting the selected operating frequency, sets the low-operating frequency in the processing circuit upon being instructed by the notification section to perform the fixing to the low-operating frequency, and restarts, in response to the release of the fixing, setting of an operating frequency according to a processing situation in the processing circuit selected by the basic software from among the plurality of operation allowing frequencies.

* * * * *